US 8,095,812 B2

(12) United States Patent
Cho et al.

(10) Patent No.: US 8,095,812 B2
(45) Date of Patent: Jan. 10, 2012

(54) LOW POWER ZIGBEE DEVICE AND LOW POWER WAKE-UP METHOD

(75) Inventors: Koon Shik Cho, Gyeonggi-do (KR); Tah Joon Park, Gyeonggi-do (KR); Yong Il Kwon, Gyeonggi-do (KR); Sang Hyun Min, Gyeonggi-do (KR); Bo Il Seo, Gyeonggi-do (KR)

(73) Assignee: Samsung Electro-Mechnics Co., Ltd., Gyunggi-do (KR)

( * ) Notice: Subject to any disclaimer, the term of this patent is extended or adjusted under 35 U.S.C. 154(b) by 410 days.

(21) Appl. No.: 12/347,865

(22) Filed: Dec. 31, 2008

(65) Prior Publication Data

US 2010/0115302 A1 May 6, 2010

(30) Foreign Application Priority Data

Oct. 30, 2008 (KR) .................. 10-2008-0107056

(51) Int. Cl.
*G06F 1/26* (2006.01)
*G06F 1/32* (2006.01)
(52) U.S. Cl. .............. 713/320; 713/300; 713/323
(58) Field of Classification Search .......... 713/300, 713/320, 323, 340
See application file for complete search history.

(56) References Cited

U.S. PATENT DOCUMENTS

| 6,366,957 B1 * | 4/2002 | Na ........................ 709/229 |
| 2005/0188232 A1 * | 8/2005 | Weng et al. ............... 713/320 |
| 2005/0215274 A1 | 9/2005 | Matson et al. |
| 2007/0115827 A1 | 5/2007 | Boehnke et al. |
| 2009/0063878 A1 * | 3/2009 | Schmidt et al. ........... 713/310 |

FOREIGN PATENT DOCUMENTS

| JP | 11110089 | 4/1999 |
| JP | 2007520923 | 7/2007 |
| KR | 10-2006-0066904 A | 6/2006 |

OTHER PUBLICATIONS

Japanese Office Action for Application No. 2009-011800 mailed May 17, 2011.

* cited by examiner

*Primary Examiner* — Thomas Lee
*Assistant Examiner* — Xuxing Chen
(74) *Attorney, Agent, or Firm* — Lowe, Hauptman, Ham & Berner, LLP

(57) ABSTRACT

Provided is a low-power ZigBee device provided with a sleeping mode and an active mode including a power supplying unit for supplying a power; a Medium Access Control (MAC) processing unit for receiving a wake-up packet and for controlling a modem unit and an Radio Frequency (RF) unit; and a Central Processing Unit (CPU) for receiving and processing a data packet, wherein the MAC processing unit makes the power supplying unit apply a power to the CPU based on a result of checking an identification (ID) of the wake-up packet.

10 Claims, 3 Drawing Sheets

[FIG. 1]
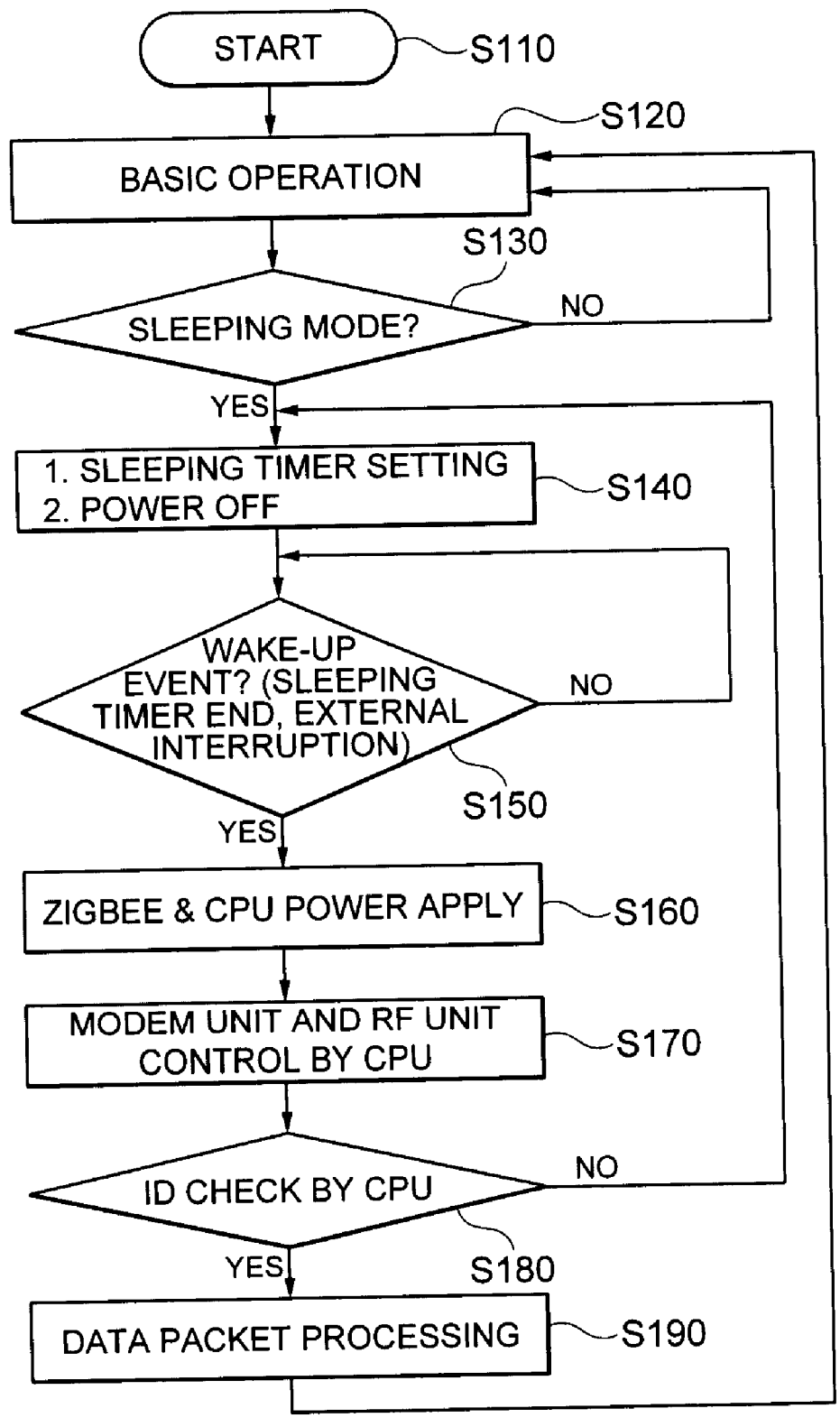
- PRIOR ART -

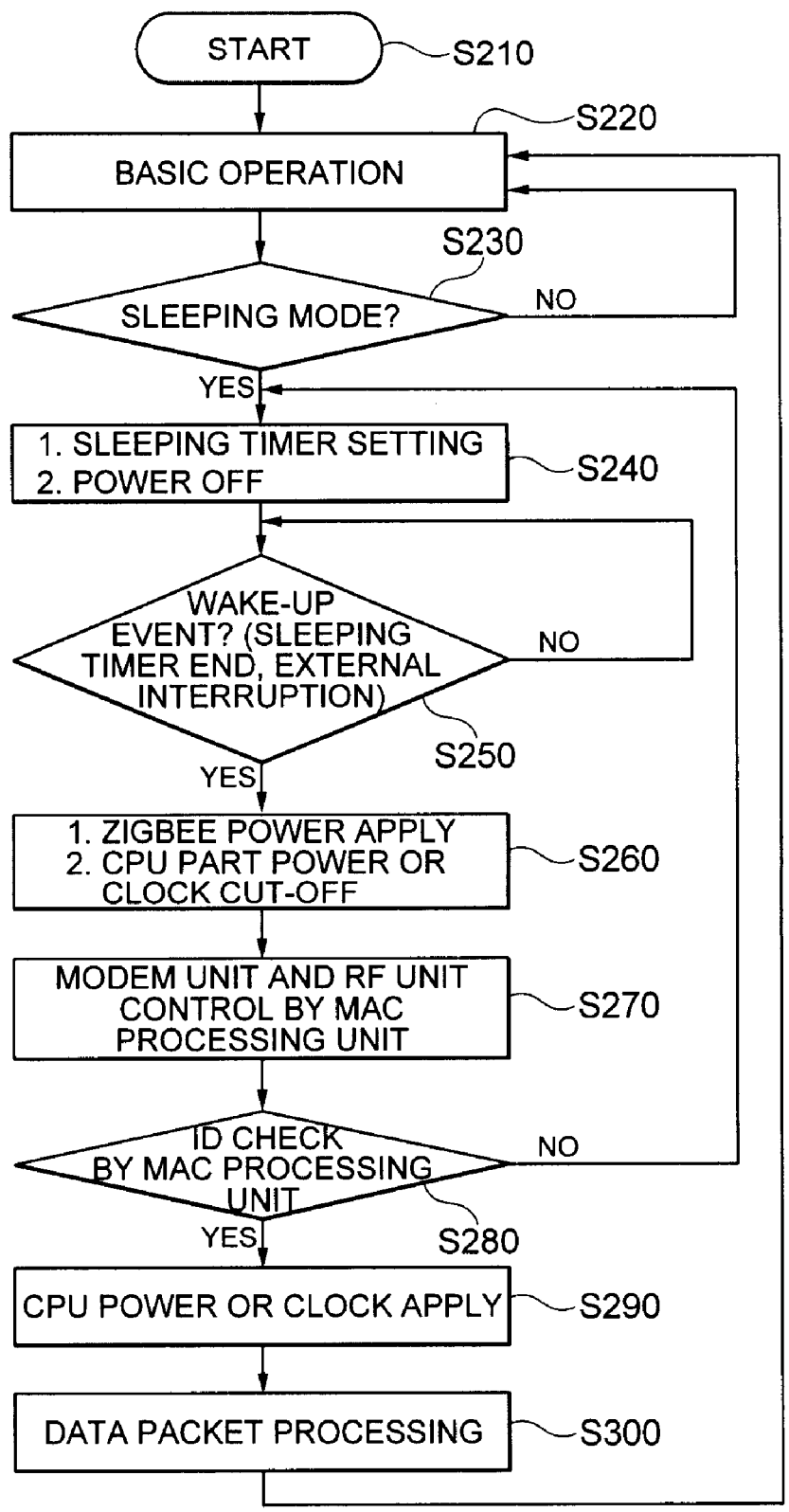
[FIG. 2]

[FIG. 3]
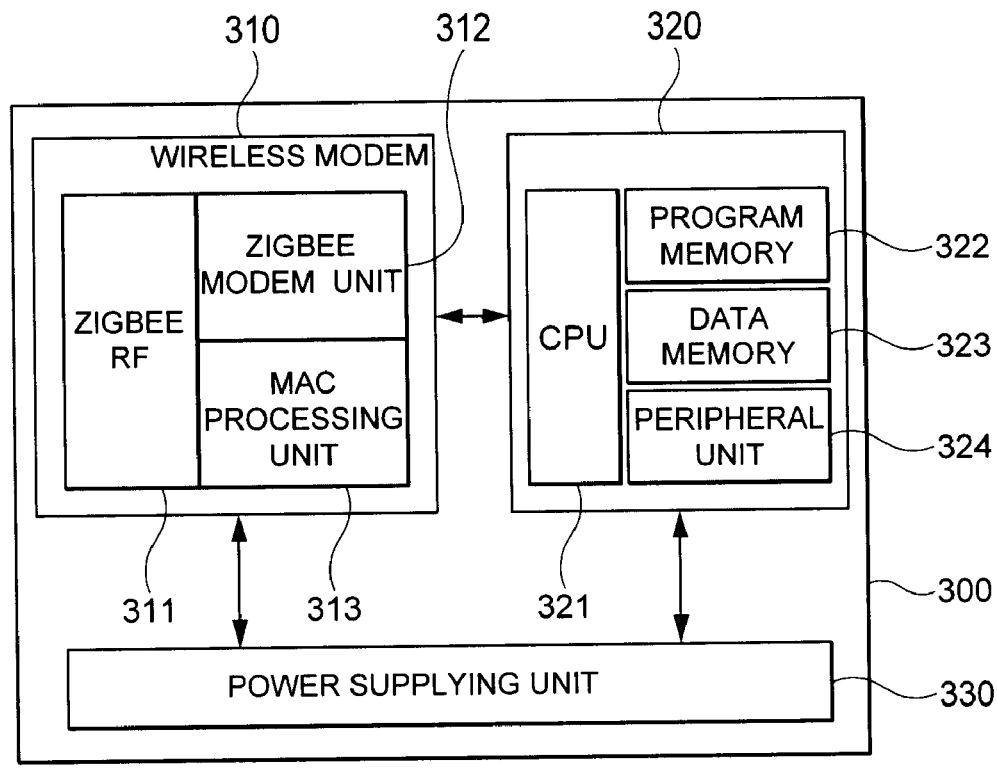
[FIG. 4]
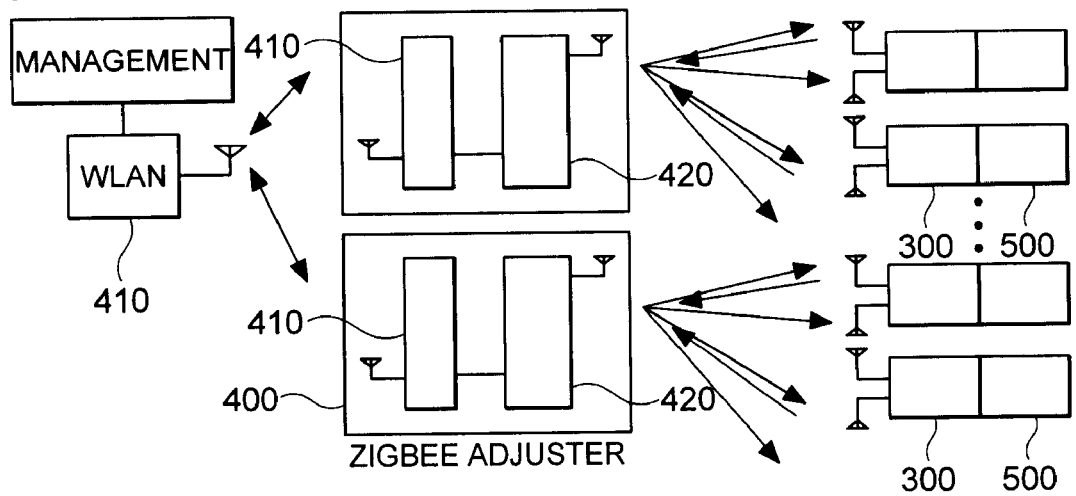

LOW POWER ZIGBEE DEVICE AND LOW POWER WAKE-UP METHOD

CROSS-REFERENCE TO RELATED APPLICATIONS

This application claims the benefit of Korean Patent Application No. 10-2008-0107056 filed with the Korea Intellectual Property Office on Oct. 30, 2008, the disclosure of which is incorporated herein by reference.

BACKGROUND OF THE INVENTION

1. Field of the Invention

The present invention relates to a ZigBee device which is changed from a sleeping mode to an active mode as a low power wake-up method in a ZigBee communication system and an accompanied low power wake-up method, and more particularly, to a low power ZigBee device and a low power wake-up method for checking even an I.D. of a wake-up packet at a MAC processing unit of a wireless modem unit unlike a prior art in which both a wireless modem and a Central Processing Unit (CPU) are supplied with electric power for receiving and checking the wake-up packet in case that a ZigBee device receives the wake-up packet.

2. Description of the Related Art

A ubiquitous computing technology related to a wireless networking of a local area communication market such as a home and an office is one of the most noticed fields nowadays. A ZigBee, one of Wireless Personal Area Network (WPAN) technologies, has been standardized in IEEE 802.15.4 as a wireless network standard for a 2.4 GHz-based home automation and data characterized by low power, low cost and slow speed. Referring to the above-mentioned standard, the ZigBee uses frequency bandwidths of 2.4 GHz, 915 MHz and 868 MHz, and can have a transfer speed of 250 kbps (16 channels at 2.4 GHz ISM bandwidth), 40 kbps/20 kbps (10 channels at 915 MHz/one channel at 868 MHz) according to a frequency, and a modem method transfers data at a speed of 20 kbps to 250 kbps within a radius of 30 m as a Direct Secure Spread Spectrum (DSSS) and can construct a large-scale wireless sensor network indoors and outdoors by connecting 255 devices at maximum to one wireless network.

The ZigBee has an advantage of realizing the cheapest chipset since an ultra low power consumption is possible and a construction of a wireless receiving and transmitting circuit is simplified in comparison with other WPAN technologies such as Bluetooth or Ultra Wide Band (UWB), and thus it is a competitive local area wireless communication system at a vertical application area such as a sensor network. For instance, by adopting the ZigBee into illumination/fire sensing/air conditioning system in a building, a building manager can perform manage and control operations of a building system in remote control through a portable device not being in a maintenance office.

Meanwhile, a study of a System On a Chip (SoC) such as the WPAN, UWB and RFID has been processed. Generally, the SoC means that a system is embodied on one chip. The SoC for a wireless communication includes an RF unit, a modem unit, a memory, a CPU and a peripheral block, and thus low power consumption becomes an important requisition. To reduce power consumption of products becomes a factor to determine a market competitive power in the products adopting the SoC powered by a battery for the wireless communication.

In case of constructing an Electronic Shelf Labels (ESL) system by using the SoC for the wireless communication, each end device reduces power consumption by using a sleeping mode.

FIG. 1 is a flow diagram showing a wake-up method according to a prior art.

Firstly, if entering a sleeping mode (S130), a sleeping timer is set and power is cut-off (S140). A condition for an end device to be woken-up from the sleeping mode is a state in which it communicates with a high rank device, e.g., a coordinator, if its I.D. is received after periodically wakes-up and receives a wake-up packet; or a state in which it is woken-up by an external interruption and communicates with a high rank device (S150).

That is, if a wake-up event occurs, both a wireless modem unit and a CPU are woken-up and supplied with electric power for processing the wake-up packet in the conventional system of SoC (S160). Thereafter, the CPU controls the wireless modem to receive and process the wake-up packet (S170). At this time, if the wake-up packet is not its packet, it enters the sleeping mode again (S180), and if the wake-up packet is its packet, the CPU processes a data packet (S190).

It is very important to reduce power consumption since the SoC used in the sensor network is powered by a limited battery. In a general SoC, power consumption for operating the CPU accounts for large portion of whole power consumption.

Generally, for reducing power consumption of the SoC, a method of lowering an operational frequency and a method of cutting-off a power supply by cutting-off a voltage regulator have been mostly used. A system clock of the CPU used in the SoC uses a crystal-oscillator of several tens of MHz. The CPU operates a whole system by repeatedly performing an operation of reading/writing a data memory and a program memory, which consume large power.

Therefore, according to the conventional wake-up method of the SoC, both the CPU and the wireless modem are supplied with electric power if the wake-up event occurs not checking whether a packet is its packet or not, and thus unnecessary power consumption occurs.

SUMMARY OF THE INVENTION

The present invention has been proposed in order to overcome the above-mentioned problems. Embodiments of the present invention are directed to providing a ZigBee device, particularly a ZigBee end device, in which, in case of changing from the sleeping mode to the active mode, unnecessary power consumption can be reduced by applying power only to a wireless modem unit for receiving a wake-up packet and determining whether power is applied to a CPU unit according to a result of check in which a MAC processing unit among that checks its I.D. instead of checking whether a wake-up packet is received by the CPU by applying the power to both a wireless modem unit and the CPU unit.

According to an aspect of the invention, a low-power ZigBee device provided with a sleeping mode and an active mode comprises power supplying unit for supplying a power; a Medium Access Control (MAC) processing unit for receiving a wake-up packet and for controlling a modem unit and an Radio Frequency (RF) unit; and a Central Processing Unit (CPU) for receiving and processing a data packet, wherein the MAC processing unit makes the power supplying unit apply the power to the CPU based on a result of checking an identification (ID) of the wake-up packet.

According to another aspect of the invention, a low-power wake-up method of a ZigBee device provided with a power supplying unit, a MAC processing unit and a CPU comprises the steps of: setting a sleeping timer and setting a sleeping mode by cutting-off power of the ZigBee device; applying the power to the MAC processing unit if a wake-up event occurs; controlling a modem unit and an RF unit by the MAC processing unit and receiving a wake-up packet and checking an ID of the wake-up packet; and applying the power to the CPU in case that the ID is its ID according to the ID check result.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a flow chart showing a wake-up method according to a prior art;

FIG. 2 is a flow chart depicting a wake-up method in accordance with an embodiment of the present invention;

FIG. 3 is a block diagram depicting a low-power ZigBee device in accordance with an embodiment of the present invention; and FIG. 4 is a construction diagram illustrating an ESL system in accordance with an embodiment of the present invention.

DETAILED DESCRIPTION OF THE PREFERRED EMBODIMENTS

Details related to a technical construction and an operating effect for the objects of a low-power ZigBee device and a low-power wake-up method in accordance with the present invention will be clearly understood by detailed explanations with reference to following drawings in which preferred embodiments of the present invention are shown.

Firstly, below-mentioned abbreviations are explained as follows.

RF (Radio Frequency)
MAC (Medium Access Control)
CPU (Central Processing Unit)
SoC (System On a Chip)
ESL (Electronic Shelf Labels)
Low-Power Wake-Up Method for ZigBee Firstly, FIG. 2 is a flow chart depicting a wake-up method in accordance with an embodiment of the present invention.

In a low-power wake-up method of a ZigBee device, which includes a power supplying unit, a MAC processing unit and a CPU in accordance with the present invention, the MAC processing unit of a wireless modem receives and process a wake-up packet instead of always operating the CPU for receiving and processing the wake-up packet, and thus power consumption due to the operation of the CPU can be reduced so that a wake-up method capable of effectively controlling a ZigBee end device in an aspect of power is provided.

As shown in FIG. 2, the end device firstly performs a basic operation (S220) and then enters a sleeping mode (S230). The sleeping mode is set by setting a sleeping timer and cutting-off a power supply of the ZigBee device (S240).

At the sleeping mode, it is determined whether the sleeping timer is finished or there is an external interruption. If the sleeping timer is not finished or there is not an external interruption, the sleeping mode is maintained. Meanwhile, if the sleeping timer is finished or there is an external interruption, firstly, a power is applied to the MAC processing unit of the wireless modem unit (S260). At this time, power or a clock of the CPU is in a state of being cut-off. Thereafter, the MAC processing unit controls the modem unit and RF unit and receives the wake-up packet (S270).

Once the MAC processing unit receives the wake-up packet, it checks whether the packet is its packet or not through an Identification (I.D.). According to a result of checking the I.D., in case that the packet is its packet, the MAC processing unit makes the power supplying unit apply the power to the CPU unit (S290). Thereafter, the CPU processes a data packet (S300).

That is, at the time of wake-up, only the wireless modem is in a state of being supplied with the power and the CPU unit is in a state of being cut-off from the power or the clock. At this state, the MAC processing unit controls the wireless modem to receive the wake-up packet and even check the I.D. In case that the I.D. is its I.D., the MAC processing unit wakes-up the CPU to communicate with a high rank device, e.g., a coordinator. In case that the I.D. is not its I.D., it makes the CPU enter the sleeping mode again.

Also, according to a result of checking the I.D. of the wake-up packet at the MAC processing unit, in case that the I.D. is not its I.D., it is converted to the sleeping mode again.

The present invention proposes a method of reducing power consumption by processing a wake-up packet at the MAC processing unit of the wireless modem instead of always operating the CPU for receiving and processing the wake-up packet.

Accordingly, although not its packet, in case of receiving a high Received Signal Strength Indication (RSSI) signal is received, unnecessary power consumption due to operating the CPU together with the wireless modem can be prevented.

In the conventional art, there are many methods of determining whether a signal is its packet by using the RSSI. However, in this case, since there are many cases that the RSSI is increased because of an interruption when there are lots of WLANs near the ZigBee end device, the signal is often acknowledged as the wake-up signal causing unnecessary power consumption. In accordance with the present invention, since the MAC processing unit applies the power to the CPU after checking even the I.D. for determining whether a signal is its packet, the above-mentioned problem of unnecessary power consumption can be solved.

Low-Power ZigBee Device

FIG. 3 is a block diagram depicting a low-power ZigBee device in accordance with an embodiment of the present invention.

Firstly, the low-power ZigBee device 300 including a sleeping mode and an active mode in accordance with the embodiment of the present invention includes a wireless modem 310, a CPU unit 320 and a power supplying unit 330.

The wireless modem 310 includes a ZigBee RF 311, a ZigBee modem unit 312 and a MAC processing unit 313, and the CPU unit includes a CPU 321, a program memory 322, a data memory 323 and a peripheral unit 324. Meanwhile, the power supplying unit 330 applies the power to the wireless modem 310 and the CPU unit 320.

The MAC processing unit 313 of the wireless modem 310 receives the wake-up packet and controls the ZigBee modem unit 312 and the ZigBee RF unit 311. While the ZigBee device 300 is in the sleeping mode setting the sleeping timer and cutting-off the power, if the wake-up event occurs, the power supplying unit 330 supplies the MAC processing unit 313 with the power by applying a power to the wireless modem 310. At this time, the power is applied to only the wireless modem 310 and is not applied to the CPU unit 320.

The MAC processing unit 313 controls the ZigBee RF 311 and the ZigBee modem unit 312 to receive the wake-up packet and checks the I.D. of the received wake-up packet for determining whether the I.D. is its I.D.

According to the I.D. checking result, if the I.D. is not its I.D., it enters the sleeping mode again, and if the I.D. is its I.D., it controls the power supplying unit 330 to apply the power to the CPU unit 320. Therefore, only in case of confirming its packet, the power is applied to the CPU unit 320.

That is, unlike the conventional art in which the CPU checks the I.D. for confirming its packet, the MAC processing unit 313 checks even the I.D. of the packet and then applies the power to the CPU unit 320 only in case that the I.D. is its I.D. Therefore, unnecessary power consumption can be reduced, unlike the case in which the power is applied to the CPU unit and the whole wireless modem unit because the wake-up event occurs even if the I.D. is not its I.D.

The CPU unit 320 is in a state of being cut-off at the sleeping mode. Thereafter, the wake-up event occurs so that the MAC processing unit 313 makes the power supplying unit 330 apply the power to the CPU unit 320 in case that the I.D. of a received wake-up packet is its I.D. Thereafter, the CPU 321 receives and processes a data packet.

In other words, even if its packet is received, the power is supplied to the CPU unit 320 only in case that the received packet is judged. That is, the power is not applied to the CPU unit just because the sleeping timer is finished or the wake-up event due to an external signal occurs. This point is one of the largest differences between the conventional ZigBee device and the present invention.

In case that the wake-up event occurs, the power supplying unit 330, which supplies a power to the ZigBee device 300 in accordance with the present invention, supplies the power only to the wireless modem 310. Also, as above-mentioned, according to a result of confirming the I.D. of a received wake-up packet of the MAC processing unit 313, only in case that the packet is identified as its packet, the power supplying unit 330 applies a power to the CPU unit 320.

FIG. 4 is a construction diagram illustrating an ESL system in accordance with an embodiment of the present invention.

Recently, the ESL system has been more and more frequently used in an area such as a super discount shop where products are displayed with a price. The ESL system has been spotlighted in connection with a ubiquitous for solving a problem of a cumbersome manual correction of price labels in case of changing price information when a price is often changed or a discount event occurs temporarily.

Let the SoC for the ESL, which shows price information of products on a display stand in the super discount shop, be exemplified as the ZigBee end device. In the center, information is managed by a WLAN 410. Price information which corresponds to prices of products on each display stand is set as ZigBee data and is transferred to a ZigBee coordinator 400. A ZigBee coordinator 400 is constructed with the WLAN 410 and a ZigBee SoC 420 in the same manner. The ZigBee coordinator 400 transmits the price information to the ZigBee end device which is a child device of the ZigBee coordinator 400. A SoC 300 for the ESL is shown as one embodiment of the ZigBee end device. The SoC 300 for the ESL displays the price information received from the ZigBee coordinator 400 on a display device 500 (for instance, seven segment LED). The SoC 300 for the ESL is attached to the display stand with the display device 500.

An end device powered by a battery, such as the ESL system, should be capable of being operated for five to seven years with a single battery because of characteristics of a production. According to characteristics of the ESL system, the end device should irregularly update information for changing price information and a discount event (for instance, breaking half-price discount event from 1 p.m. to 2 p.m.) and should process this operation within a short time. Therefore, the end device should check whether there is information should be updated by the end device through a periodic wake-up at an interval of about 1 minute to 10 minutes. This update may occur twice or three times in a day. Considering this system, it is very important to reduce power consumption of the CPU unit which consumes several mA to tens of mA.

Also, as in the embodiment, price information of a production of the super discount shop may include items (for instance, vegetables and fruits) which should be updated daily, items (for instance, industrial products) which have a fixed price for some time or items which are discounted at a particular time for an event. That is, even the SoC for the ESL which displays a price, there may be not its data even if it regularly wakes-up according to characteristics of productions. Therefore, the ZigBee coordinator 400 informs a whole network with information to be updated, and the SoC 300 for the ESL as the end device should receive only its packet and process it (i.e., display changed price information). Accordingly, in case of the SoC 300 for the ESL which sets a wake-up period identically, in case that it checks its I.D. and applies the power to the CPU unit 320, unnecessary power consumption can be considerably reduced.

Actually, in case of a low-power ZigBee end device of 32 MHz, an effect of reducing 50% of power consumption can be obtained in comparison with the conventional ZigBee end device in which both the CPU unit and the wireless modem unit are woken-up. Accordingly, the ZigBee device in accordance with the present invention has an advantage of extending a period of use twice in comparison with the conventional device.

In the ZigBee device, particularly the ZigBee end device, in accordance with the present invention, in case of changing from the sleeping mode to the active mode, unnecessary power consumption can be reduced by applying the power only to the wireless modem unit for receiving a wake-up packet and determining whether a power is applied to the CPU unit according to a result of check in which the MAC processing unit among that checks its I.D. instead of checking whether a wake-up packet is received by the CPU by applying the power to both the wireless modem unit and the CPU unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimd is:

1. A low-power ZigBee device provided with a sleeping mode and an active mode, comprising:
   a power supplying unit configured for supplying power;
   a Medium Access Control (MAC) processing unit configured for receiving a wake-up packet and for controlling a modem unit and an Radio Frequency (RF) unit; and
   a Central Processing Unit (CPU) configured for receiving and processing a data packet,
   wherein the MAC processing unit is not applied with power during a period the low-power ZigBee device is in the sleep mode and is applied with power in response to an event, the event comprises that a sleep timer is finished or an external signal is detected, the CPU is not applied with power when the MAC processing unit is applied with power in response to the event, and the MAC processing unit is configured to cause the power supplying unit to apply the power to the CPU based on a result of checking an identification (ID) of the wake-up packet.

2. The low-power ZigBee device according to claim 1, wherein the power supplying unit applies the power to the MAC processing unit in response to the event.

3. The low-power ZigBee device according to claim 2, wherein the power supplying unit does not apply the power to the CPU when applying the power to the MAC processing unit in response to the event.

4. The low-power ZigBee device according to claim 1, wherein the MAC processing unit is configured to instruct the power supplying unit to apply the power to the CPU according to the result of checking the ID of the wake-up packet if the ID is consistent with an ID associated with the MAC processing unit and is changed to the sleeping mode if the ID is not the ID associated with the MAC processing unit.

5. The low-power ZigBee device according to claim 1, wherein the external signal is a Received Signal Strength Indication (RSSI) signal.

6. A low-power wake-up method of a ZigBee device provided with a power supplying unit, a Medium Access Control (MAC) processing unit, and a Central Processing Unit (CPU), the method comprising:
  setting a sleeping timer and setting a sleeping mode by cutting-off power of the ZigBee device;
  applying a power to the MAC processing unit without applying the power to the CPU if a wake-up event occurs, the wake-up event comprising that the sleep timer is finished or an external signal is detected;
  controlling a modem unit and an RF unit by the MAC processing unit and receiving a wake-up packet and checking an identification (ID) of the wake-up packet; and
  applying the power to the CPU in case that the ID is consistent with an ID associated with the MAC processing unit according to the ID check result.

7. The low-power wake-up method according to claim 6, wherein at the step of applying the power to the MAC processing unit, the power supplying unit applies the power to the MAC processing unit and does not apply power to the CPU.

8. The low-power wake-up method according to claim 7, wherein at the step of applying the power to the CPU, the MAC processing unit makes the power supplying unit apply the power to the CPU based on the result of checking the ID of the wake-up packet.

9. The low-power wake-up method according to claim 8, wherein the MAC processing unit is changed to the sleeping mode again, according to the result of checking the ID of the wake-up packet, if the ID is not consistent with the ID associated with the MAC processing unit.

10. The low-power wake-up method according to claim 6, wherein the external signal is a Received Signal Strength Indication (RSSI) signal.

* * * * *